United States Patent [19]

Kunz

[11] 4,170,269

[45] Oct. 9, 1979

[54] PRE-LOAD COMPENSATED WEIGHING APPARATUS

[75] Inventor: Peter Kunz, Tann-Rüti, Switzerland

[73] Assignee: Mettler Instrumente AG, Greifensee, Switzerland

[21] Appl. No.: 898,949

[22] Filed: Apr. 21, 1978

[30] Foreign Application Priority Data

May 18, 1977 [CH] Switzerland ............... 6174/77

[51] Int. Cl.² .................. G01G 23/14; G01G 7/00
[52] U.S. Cl. ........................... 177/165; 177/212; 177/DIG. 5
[58] Field of Search ............... 177/165, 212, DIG. 5

[56] References Cited

U.S. PATENT DOCUMENTS

| | | | |
|---|---|---|---|
| 3,186,504 | 6/1965 | Van Wilgen | 177/212 X |
| 3,788,134 | 1/1974 | Meier | 177/DIG. 5 |
| 3,890,833 | 6/1975 | Peer | 177/210 EM X |
| 4,062,417 | 12/1977 | Kunz | 177/212 |
| 4,074,781 | 2/1978 | Melcher | 177/212 |

Primary Examiner—George H. Miller, Jr.
Attorney, Agent, or Firm—Lawrence E. Laubscher

[57] ABSTRACT

An improved weighing apparatus of the electromagnetic compensation type is disclosed including at least one ferromagnetic member connected with the load-receiving system for reacting with the permanent magnetic field of the apparatus to compensate for the dead-load forces which act on the load-receiving system. Preferably the ferromagnetic members are connected with the coil carrier member in circumferentially spaced relation about the axis of the load receiver member. The permanent magnet which produces the magnetic field and the ferromagnetic members preferably have generally mutually-compensating temperature coefficients of magnetic performance.

3 Claims, 2 Drawing Figures

PRE-LOAD COMPENSATED WEIGHING APPARATUS

BRIEF DESCRIPTION OF THE PRIOR ART

Weighing apparatus of the electromagnetic compensation type are well known in the patented prior art, as evidenced, for example, by the U.S. patents Nos. to Baumgartner 3,677,357, Strobel 3,688,854, Kunz 3,786,678 and Bauman 3,816,156. Various systems for modifying the compensating current to produce uniform weighing operation have been disclosed in the U.S. Pat. Nos. to Strobel et al 3,986,571 and Kunz 4,062,417 and the Kaufmann U.S. application Serial No. 732,480 filed Oct. 14, 1976.

The known weighing systems of the electromagnetic compensation type normally include load-receiving means such as a pan assembly, and a compensation coil which is rigidly coupled to the load-receiving means and which is arranged in the air gap of a permanent magnet system. In operation, a compensation current which is dependent on the load on the load-receiving means flows through the coil to provide an electromagnetic force to counteract or compensate for the load. One form of this balance which is widely used today is a top-pan balance with a load-receiving means which are so mounted by a link assembly as to move parallel to itself when a load is placed on the pan. A fundamental weakness of many balances with electromagnetic force compensation is particularly apparent with this form of balance, namely both the load to be weighed (including a possible tare) and also the weight of the load-receiving means itself (the dead load) must be compensated by the current flow through the coil, as the proportion of the dead load which is carried by the link assembly is so small as to be virtually negligible. On the other hand, however, it is desirable that the current consumption, and thus the heat generated in the magnet system air gap, should be kept as small as possible, thereby to minimize heat drift of the balance.

SUMMARY OF THE INVENTION

The present invention is directed toward an improved weighing apparatus of the electromagnetic compensation type including means for compensating for the pre-load effects which act on the load receiver means.

A primary object of the present invention is to provide an improved weighing apparatus including load-receiving means for receiving a load to be weighed, a permanent magnet system having an air gap, a coil carrier secured to the load-receiving means, a coil on the coil carrier and arranged in the air gap of the permanent magnet system, means for supplying to the coil a compensation current which is dependent on the load to be weighed, thereby to provide electromagnetic force compensation therefor, and at least one ferromagnetic member secured to the load-receiving means adjacent the region of the permanent magnet field, thereby to approximately compensate for the pre-load effects which act on the load-receiving means.

By virtue of the magnetic pre-loading compensation means of the present invention, the coil current consumption can be reduced, with the same useful load to be weighed on the balance, or the useful load can be increased, with the same current consumption. This may be particularly important in balances in which the weight of the load-receiving means, coil and other movable components is high in relation to the useful load to be weighed. Furthermore, eliminating the dead load also has an advantageous effect on the digital evaluation means for determining result, for example, by reducing that part of the gross result which must be "tared away".

The balance of the present invention affords an improved relationship between the generation of heat in the air gap of the permanent magnet system and the useful load of the balance.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
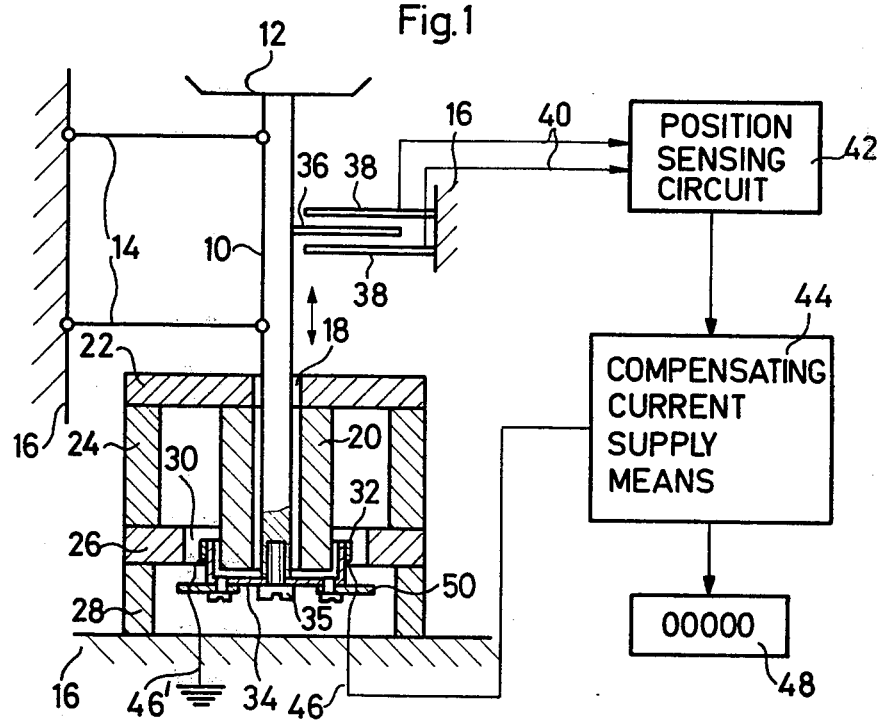
FIG. 1 is a diagrammatic representation of the improved weighing apparatus of the present invention.

Referring first more particularly to FIG. 1, the weighing apparatus includes a load-receiving means comprising a vertical tubular support 10 and a weighing pan 12 mounted on the upper end of the support 10. The load-receiving means 10, 12 is supported on balance frame 16 by means of two parallel resilient links 14, whereby the support 10 is guided for vertical movement parallel to itself. The support 10 passes with lateral or radial clearance through a central passage contained in a cylindrical iron core 20. At its upper end the core 20 is secured to an upper round closure plate 22 of ferromagnetic material, which contains a central opening 18 for the support 10. An annular permanent magnet 24 is arranged concentrically about the core 20, the magnet being connected at the top to the plate 22 and at the bottom to a pole-shoe plate 26. An annular base or rim 28 forms a mounting support for the magnet system on the balance frame 16.

A compensation coil 32 is disposed movably in an annular air gap 30 between the core 20 and the pole-shoe plate 26. The compensation coil 32 is wound on a coil carrier 34 formed of electrically insulating material, for example, a synthetic plastic material, which is fixedly connected with the load-receiving means, more specifically, the support 10.

A capacitor plate 36 is secured to the support 10 at a position between the two links 14 but at the side of the support 10 remote from the two links 14. The plate 36 is disposed in the gap between two further stationary capacitor plates 38 which are carried on the balance frame 16, the three plates 36, 38 thus forming a differential capacitor. The balance is shown in a neutral or rest position, in which the plate 36 is equidistant from each of the other two plates 38.

Other mechanical details such as balance housing, travel limiting means or abutments and the like are conventional and have been omitted for the sake of simplicity of the drawing.

The electrical part of the balance, which is shown only in diagrammatic form, is conventional in the art and includes, in addition to the coil 32 and the differential capacitor 36, 38, a position signal generating circuit 42 (generally a bridge circuit) connected with the capacitor plates 38 by leads 40, which circuit supplies a position-responsive signal to the compensating current supply means 44, which includes a control amplifier, a current source and an evaluation circuit. The compensating current supply means has a first output terminal connected with ground via conductor 46 and the compensation coil 32, and a second output terminal connected with the display means 48.

In accordance with a characterizing feature of the present invention, as will be described in greater detail below, a plurality of circumferentially spaced radially outwardly extending coplanar horizontal ferromagnetic members 50 are secured by screws 52 to the bottom of the coil carrier 34, thereby to react with the field of the permanent magnet 24 to compensate for the pre-load forces which act on the load-receiving means.

Operation

In operation, upon the application of a load to the load receiving pan 12, the resulting deflection of the load-receiving means 10, 12 from the neutral or no-load position causes the respective distances between the capacitor plate 36 and the respective other plates 38 to vary, thereby producing a difference or error signal in the transmitter circuit 42. In the control part of the circuit 44, this signal determines the magnitude of a compensation current which is to be passed through the coil 32. The electromagnetic force action of the coil current in the magnetic field in the air gap 30, when the balance is in a stable or equilibrium condition, provides for compensation of the effect of the weight of the material to be weighed on the weighing pan 12 (including a tare if there is one), and the load-receiving means is returned substantially to the neutral position. The magnitude of the compensation coil current required for this is converted to a digital weight value in the evaluation part of the circuit 44, and is displayed by the display means 48.

Figure 2:
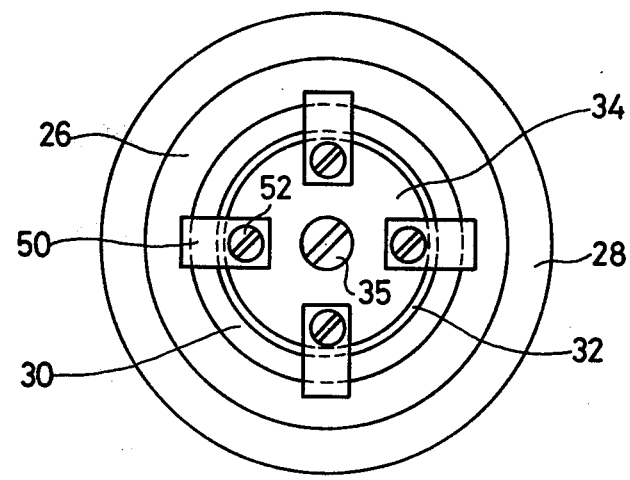
FIG. 2 is a bottom view of the apparatus of FIG. 1.

Referring now to FIG. 2, the balance illustrated has at least one ferromagnetic member, here shown as four iron members 50 which are secured by screws 52 to the coil carrier 34 in equally spaced circumferential arrangement relative to the axis of the support 10. The members 50 are formed from a ferromagnetic material having a temperature coefficient of magnetic performance which corresponds to that of the material of the permanent magnet system 20 to 26, thereby providing a magnetic pre-loading to at least approximately compensate for the dead load of the balance, thus making use of the leakage field of the permanent magnet system. This arrangement makes it possible to achieve a uniform pre-loading compensation action which is substantially independent of fluctuations in the temperature of the components.

Owing to the provision of conventional cooperating abutment means (not shown) on the load-receiving means and on the frame, the possibility of contact between the members 50 and the pole-shoe plate 26 is prevented, whereby there cannot be any "sticking" of the load-receiving means.

While the present invention has been described above with reference to a top-pan balance without a balance beam, it is apparent that the balance could take other forms, such as a balance with a balance beam or transmission levers, the prerequisite being that there is a virtually constant equilibrium or stable condition, in order to avoid changes in the magnetic pre-loading force, which is of course dependent on the spacing of the members 50 from the magnet system 20 to 26.

In a modified form of the above balance, permanent magnets could be used instead of the ferromagnetic members 50. The arrangement used will depend on the construction of the balance (for example, whether it has a transmission lever or not, or whether the compensation coil is at the lower or the upper end of the pot magnet system) and the resulting desired direction of the pre-loading force.

The ferromagnetic members are advantageously so dimensioned that they compensate for only about 90 to 95% of the dead load, and the remainder is electromagnetically compensated by the taring means which is normally provided, or by zero-point correction.

Although in the above-described embodiment the ferromagnetic members 50 are fixed to the coil carrier, they may alternatively be secured to the load-receiving means 10, 12 at other positions thereon in the vicinity of the permanent magnet system, it being appreciated that to provide a uniform magnetic force action (without turning or bending moments) it is desirable to employ a multiplicity of ferromagnetic members arranged in a uniform circumferentially spaced manner.

What is claimed is:

1. In a weighing system of the electromagnetic compensation type including a frame; load-receiving means connected with said frame for movement from an initial no-load position; permanent magnet means connected with the frame, said permanent magnet means including an air gap; coil carrier means connected with said load-receiving means, said coil carrier means being arranged in said air gap and being formed of insulating material; a compensation coil connected with said load-receiving means in said air gap; means operable when said load-receiving means is displaced, upon the application of a load thereto, from the no-load position for supplying compensating current to said compensation coil to produce an electromagnetic force for returning the load-receiving means to its initial no-load position; dead-load compensating means for compensating for the substantially constant dead-load mass of said load receiving means; and display means responsive to the magnitude of the compensating current for indicating the weight of the applied load:

the improvement wherein said dead-load compensating means comprises:
a plurality of ferromagnetic members connected with said coil carrier means in concentrically arranged radially-extending relation relative to the axis of travel of said load receiving means, said permanent magnet means and said ferromagnetic members having corresponding mutually-compensating temperature coefficients of magnetic performance.

2. Apparatus as defined in claim 1, wherein at least some of said ferromagnetic members comprise permanent magnets.

3. Apparatus as defined in claim 1, wherein said ferromagnetic members compensate for about 90–95% of the dead load of said load-receiving means.

* * * * *